(12) United States Patent
Trainer et al.

(10) Patent No.: US 11,873,109 B2
(45) Date of Patent: Jan. 16, 2024

(54) ELECTRICAL POWER SYSTEM

(71) Applicant: ROLLS-ROYCE plc, London (GB)

(72) Inventors: David R. Trainer, Derby (GB); Francisco Javier Chivite Zabalza, Stafford (GB); Mark Sweet, Chesterfield (GB); Luke George, Derby (GB); Gian Incerpi, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 18/053,015

(22) Filed: Nov. 7, 2022

(65) Prior Publication Data
US 2023/0159177 A1 May 25, 2023

(30) Foreign Application Priority Data

Nov. 24, 2021 (GB) ...................................... 2116919

(51) Int. Cl.
*B64D 27/24* (2006.01)
*H02J 1/10* (2006.01)
*H02J 7/34* (2006.01)
*H02M 3/28* (2006.01)

(52) U.S. Cl.
CPC .............. *B64D 27/24* (2013.01); *H02J 1/106* (2020.01); *H02J 7/34* (2013.01); *H02M 3/28* (2013.01); *B64D 2221/00* (2013.01); *H02J 2310/44* (2020.01)

(58) Field of Classification Search
CPC .................................................... B64D 27/26
See application file for complete search history.

(56) References Cited

U.S. PATENT DOCUMENTS

| | | |
|---|---|---|
| 2005/0099155 A1 | 5/2005 | Okuda et al. |
| 2006/0055367 A1 | 3/2006 | Iwata et al. |
| 2007/0070654 A1 | 3/2007 | Liu et al. |
| 2014/0217820 A1 | 8/2014 | Imai |
| 2016/0211538 A1 | 7/2016 | Agnew |
| 2017/0155276 A1 | 6/2017 | Harada et al. |

(Continued)

FOREIGN PATENT DOCUMENTS

EP 3565101 A1 11/2019

OTHER PUBLICATIONS

Great Britain search report dated May 18, 2022, issued in GB Patent Application No. 2116919.8.

(Continued)

*Primary Examiner* — Jared Fureman
*Assistant Examiner* — Esayas G Yeshaw
(74) *Attorney, Agent, or Firm* — Crowell & Moring LLP

(57) ABSTRACT

The disclosure relates to an electrical power system for providing a stabilised DC voltage to a power bus. Example embodiments include an electrical power system comprising: a DC power bus having first and second DC power bus terminals; an electrical storage unit having first and second terminals, the second terminal connected to the second DC power bus terminal; a DC:DC converter having first and second DC:AC converters and a transformer connected between the first and second DC:AC converters, the first DC:AC converter connected between the first terminal of the electrical storage unit and the first DC power bus terminal; and a controller connected to control a switching operation of one or both of the first and second DC:AC converters.

18 Claims, 11 Drawing Sheets

(56) References Cited

U.S. PATENT DOCUMENTS

| | | |
|---|---|---|
| 2019/0157979 A1 | 5/2019 | Higaki et al. |
| 2020/0207227 A1* | 7/2020 | Tan .......................... H02J 7/02 |
| 2021/0075331 A1* | 3/2021 | Tariq ....................... B60L 53/20 |
| 2021/0152016 A1* | 5/2021 | Pmsvvsv ................. H02J 9/061 |
| 2022/0371532 A1* | 11/2022 | Huh ........................ F01D 15/10 |

OTHER PUBLICATIONS

Extended European Search Report, dated Apr. 26, 2023, pp. 1-7, issued in European Patent Application No. 22203171.8, European Patent Office, Munich, Germany.

* cited by examiner

ELECTRICAL POWER SYSTEM

CROSS-REFERENCE TO RELATED APPLICATIONS

This specification is based upon and claims the benefit of priority from United Kingdom Patent Application No. 2116919.8, filed on 24 Nov. 2021, the entire contents of which are incorporated herein by reference.

BACKGROUND

Technical Field

This disclosure relates to an electrical power system for provision of a stabilised DC power supply from an electrical storage unit.

Description of the Related Art

The use of an Electrical (or Energy) Storage System (ESS) is becoming an important part of advanced electrical power systems for aerospace, marine and automotive applications. An ESS typically employs a bulk energy storage medium such as a high-density battery. In some applications the ESS is generally used intermittently to provide high power for short periods of time such as for engine starting, rotating generator load-levelling (e.g. supplying load peak demands only) or during emergency conditions such as loss of a rotating generator. In other applications, including hybrid-electric and purely electric applications, the ESS may be used continuously or at least for more sustained periods. In the case of electric Vertical Take-off and Landing (eV-TOL) applications, the ESS may provide a high power for relatively short periods during take-off and landing and a somewhat lower power during flight.

It is possible to connect an electrical storage battery directly to a DC network with the battery terminal voltage determining the operating voltage of the whole DC network. Such an approach is illustrated in FIG. 4, which illustrates a DC electrical power system 400 with a direct battery connection. The system 400, which could be used in practice on an aircraft or ship, comprises a directly connected battery 401 and two DC power sources derived from rotating generators 402, 403 connected to respective HP and LP spools 404, 405 of a gas turbine, with an AC:DC converter 406, 407 connected to each respective generator 402, 403 to provide a DC voltage VDC at a voltage supply bus 408. In such a system, the DC network voltage changes depending on the current drawn from the battery 401, due to natural source resistance regulation, and the state of charge of the battery 401, i.e. its internal back EMF. Thus, the direct voltage magnitude is controlled by the battery 401, which varies with load current and the SOC (state of charge) of the battery 401 itself. Typically, the direct voltage VDC could change by up to around 20%, which results in a higher current draw to deliver the same rated power at a lower voltage and means that all loads must be designed to operate with a variable supply voltage. Furthermore, it means the average DC network voltage could change by up to 20% with other power sources, for example rotating generators coupled to the DC network through associated power electronic converters, having to follow the DC voltage set by the battery 401.

As a result, it is normal practice to connect a battery ESS to a DC network via a fully rated DC:DC power electronic converter, as illustrated schematically in FIG. 5. The electrical power system 500 comprises a DC:DC converter 501 connected between a battery 502 and DC bus 503 to provide a regulation function and to allow the voltage across the battery 502 to change as it discharges its stored energy whilst maintaining a near-constant direct voltage at the electrical network it is supplying via the DC bus 503. The DC:DC converter 501, which may be bi-directional to allow for charging and discharging of the battery 502, must be rated to pass all the electrical power provided from the battery 502 to the attached DC network. For example if the ESS 502 supplies 100 kW, the DC:DC converter 501 must also be rated for at least 100 kW. Given the intermittent nature of the power provided by the ESS 502 in some applications, the fully rated DC:DC converter 501 can remain idle for much of the time, meaning it can be considered a wasteful overhead for the electrical system 500 when not in use.

A problem with the above approach, particularly when using a battery ESS in aircraft propulsion applications, is that a fully rated converter will add substantial weight. It would be advantageous to be able to reduce the overall weight of an electrical supply system incorporating a battery ESS while not compromising on the available rated power.

SUMMARY

According to a first aspect there is provided an electrical power system comprising:

a DC power bus having first and second DC power bus terminals;

an electrical storage unit having first and second terminals, the second terminal connected to the second DC power bus terminal;

a DC:DC converter having first and second DC:AC converters and a transformer connected between the first and second DC:AC converters, the first DC:AC converter a connected between the first terminal of the electrical storage unit and the first DC power bus terminal; and a controller connected to control a switching operation of one or both of the first and second DC:AC converters.

The DC:DC converter may be bidirectional and the controller connected to control a switching operation of each of the first and second DC:AC converters. In alternative examples the DC:DC converter may be unidirectional and the controller connected to control a switching operation of the second DC:AC converter, the first DC:AC converter comprising a passive rectifier.

The second DC:AC converter may be connected across a DC power source. The DC power source may be the electrical storage unit or the DC power bus. Where the DC power bus is a first DC power bus, the electrical power system may comprise a second DC power bus, the DC power source being the second DC power bus. Where the electrical storage unit is a first electrical storage unit, the electrical power system may comprise a second electrical storage unit, the DC power source being the second electrical storage unit.

The first and second DC:AC converters may be configured to operate at up to around 20% of a power rating of the electrical storage unit. The power rating of the electrical storage unit may be 50 kW or more, for example between around 50 kW and 150 kW. In a specific example the power rating may be around 100 kW.

Each of the first and second DC:AC converters may comprise a plurality of semiconductor devices, the controller configured to control a switching operation of each of the plurality of semiconductor devices. The controller may be configured to operate the first DC:AC converter a to provide a bypass connection between the electrical storage unit and the DC power bus and disable the second DC:AC converter when a voltage across the electrical storage unit is above a threshold level.

The first DC:AC converter may be configured to provide a voltage across the DC power bus that is greater than a voltage across the electrical storage unit. The first DC:AC converter may alternatively be configured to provide a voltage across the DC power bus that is less than a voltage across the electrical storage unit.

The DC:DC converter may be a dual active bridge, DAB, converter.

The electrical power system may comprise a capacitor connected between the first terminal of the electrical storage unit and the first DC power bus terminal and a half-bridge or full-bridge switching circuit connected across the capacitor.

According to a second aspect there is provided an aircraft power and propulsion system comprising the electrical power system of the first aspect, the propulsion system comprising a DC:AC converter connected to the DC power bus, an electric machine and a fan, the electric machine connected to the DC:AC converter to receive power from the DC power bus to drive the fan.

According to a third aspect there is provided an aircraft comprising the electrical power and propulsion system of the second aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which.

DETAILED DESCRIPTION

Figure 1:
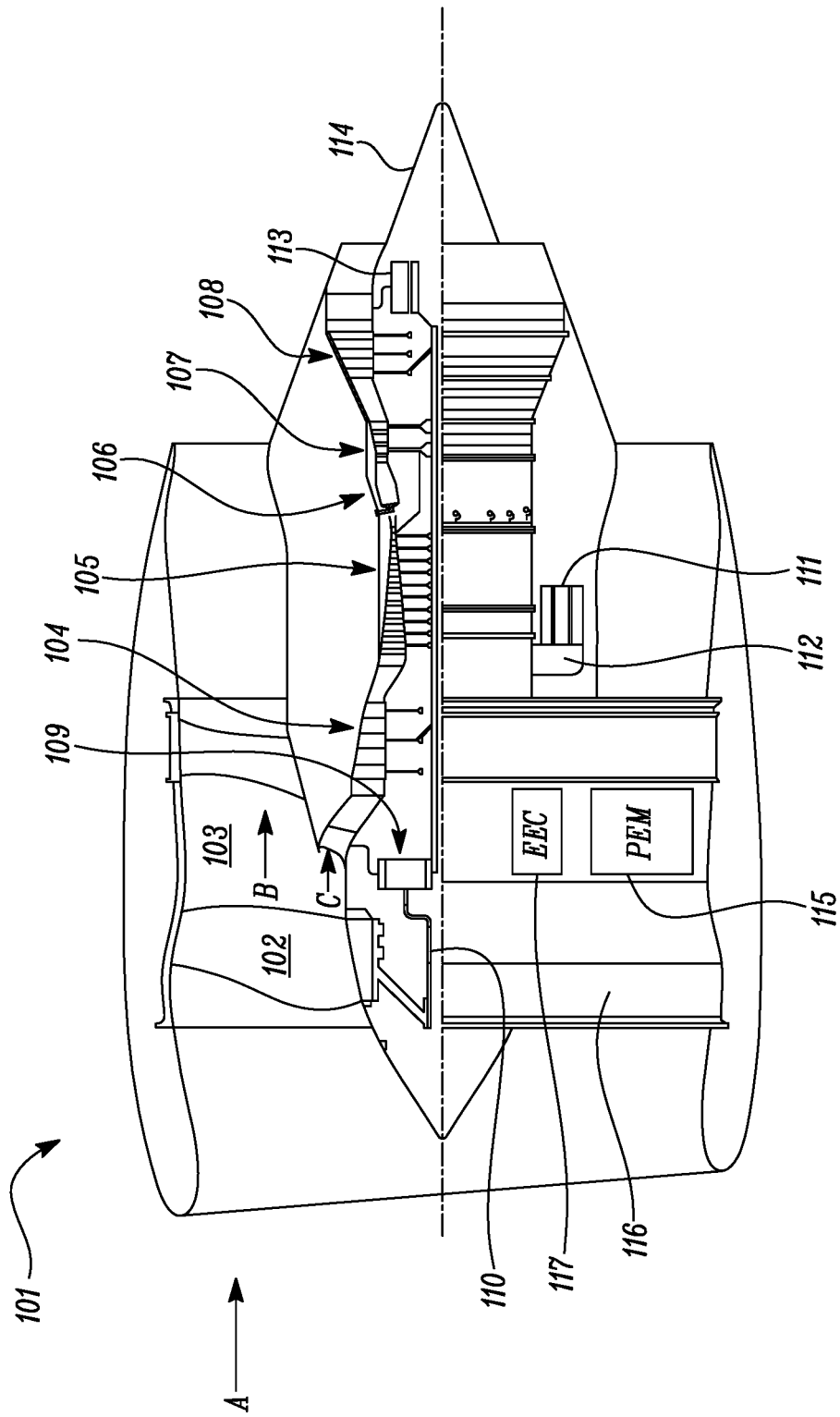
FIG. 1 shows a general arrangement of a turbofan engine for an aircraft.

A general arrangement of an engine 101 for an aircraft is shown in FIG. 1. The engine 101 is of a turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, for example three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of the present embodiment comprises one or more rotary electric machines, generally capable of operating both as a motor and as a generator. The number and arrangement of the rotary electric machines will depend to some extent on the desired functionality. Some embodiments of the engine 101 include a single rotary electric machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electric machine 111 coupled with the high pressure spool and a second rotary electric machine 113 coupled with the low pressure spool. In addition to generating electrical power and the starting the engine 101, having both first and second rotary machines 111, 113, connected by power electronics, can facilitate the transfer of mechanical power between the high and low pressure spools to improve operability, fuel consumption etc.

As mentioned above, in FIG. 1 the first rotary electric machine 111 is driven by the high-pressure spool by a core-mounted accessory drive 112 of conventional configuration. In alternative embodiments, the first electric machine 111 may be mounted coaxially with the turbomachinery in the engine 101. For example, the first electric machine 111 may be mounted axially in line with the duct between the low- and high-pressure compressors 104 and 105. In FIG. 1, the second electric machine 113 is mounted in the tail cone 114 of the engine 101 coaxially with the turbomachinery and is coupled to the low-pressure turbine 108. In alternative embodiments, the second rotary electric machine 113 may be located axially in line with low-pressure compressor 104, which may adopt a bladed disc or bladed drum configuration to provide space for the second rotary electric machine 113. It will of course be appreciated by those skilled in the art that any other suitable location for the first and (if present) second electric machines may be adopted.

The first and second electric machines 111, 113 are connected with power electronics. Extraction of power from or application of power to the electric machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electric machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e. both of the core gas turbine and the first and second electric machines 111 and 113. In this way, the EEC 117 may holistically respond to both thrust demand and electrical power demand.

The one or more rotary electric machines 111, 113 and the power electronics 115 may be configured to output to or receive electric power from one, two or more dc busses. The dc busses allow for the distribution of electrical power to other engine electrical loads and to electrical loads on the airframe. The dc busses may further receive electrical power from, or deliver electrical power to, an energy storage system such as one or more battery modules or packs.

Those skilled in the art will appreciate that the gas turbine engine 101 described above may be regarded as a 'more electric' gas turbine engine because of the increased role of the electric machines 111, 113 compared with those of conventional gas turbines.

Figure 2A:
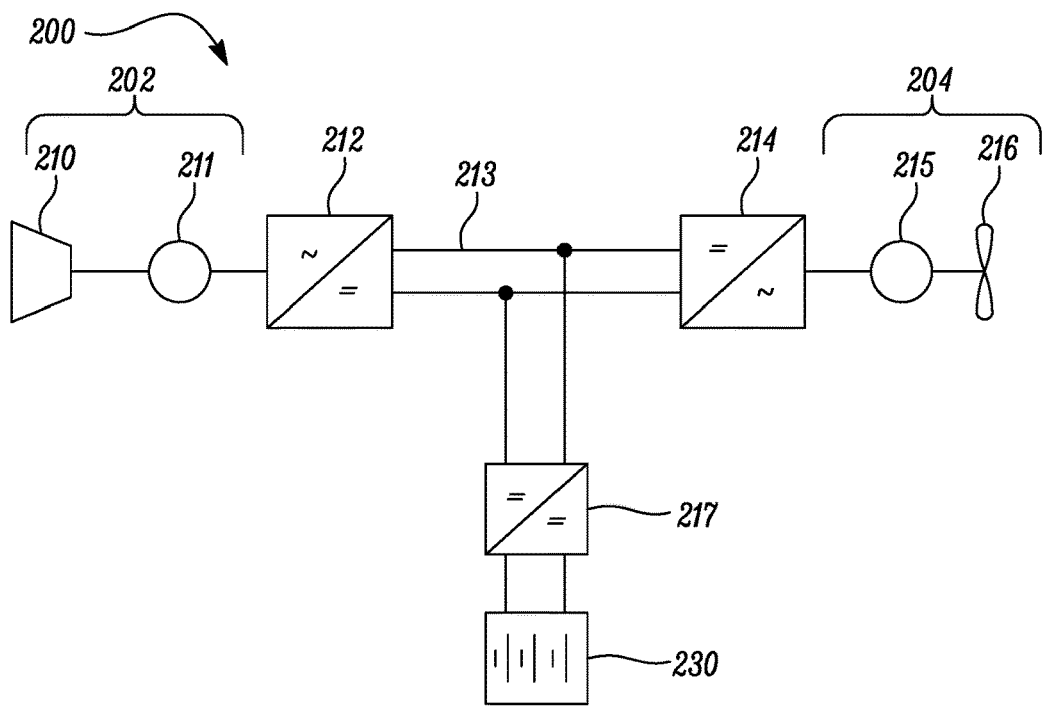
FIG. 2A is a schematic illustration of a hybrid electric aircraft propulsion system.
Figure 2B:
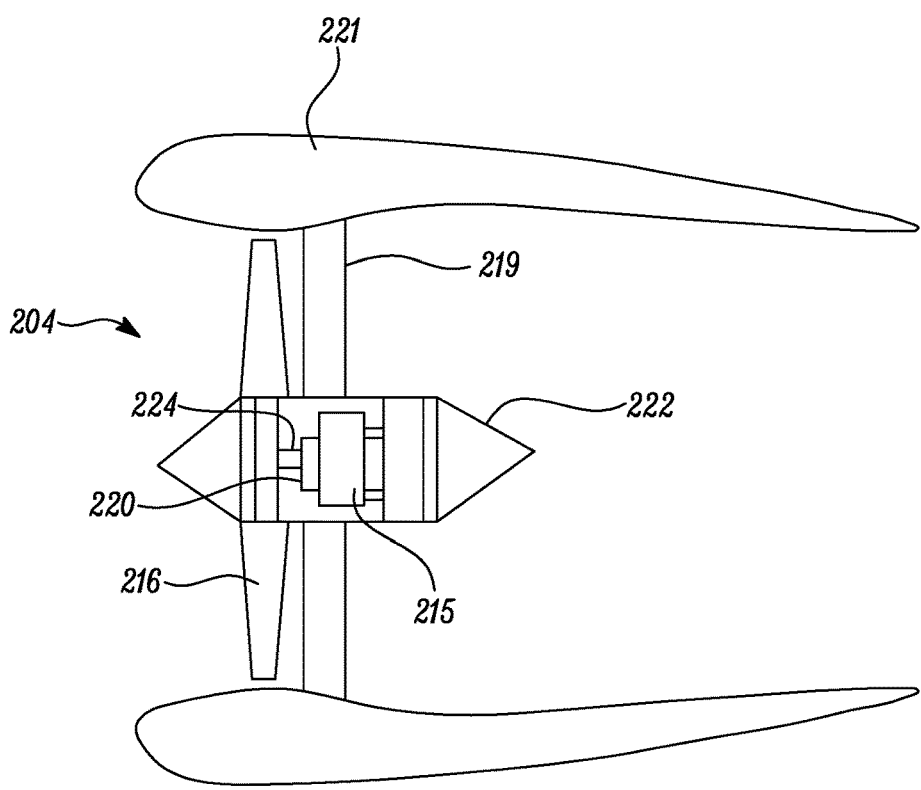
FIG. 2B illustrates an electrically powered propulsor such as may be used in a hybrid electric propulsion system.

FIG. 2A illustrates an exemplary propulsion system 200 of a hybrid electric aircraft. The propulsion system 200 includes a generator set 202 comprising an engine 210 and electrical generator 211, and a battery pack 230. Both the generator set 202 and the battery pack 230 are used as energy sources to power an electric motor-driven propulsor 204, an example of which is shown in FIG. 2B.

The illustrated propulsion system 200 further comprises an AC:DC converter 212, a dc distribution bus 213, a DC:AC converter 214 and a DC:DC converter 217. It will be appreciated that whilst one generator set 202 and one propulsor 204 are illustrated in this example, a propulsion system 200 may include more than one generator set 202 and/or one or more propulsor 204.

A shaft or spool of the engine 210 is coupled to and drives the rotation of a shaft of the generator 211 which thereby produces alternating current. The AC:DC converter 212, which faces the generator 211, converts the alternating current into direct current, which is fed to various electrical systems and loads via the dc distribution bus 213. These electrical systems include non-propulsive loads (not shown in FIG. 2A) and the motor 215 which drives the propulsor 216 via the DC:AC converter 214.

The battery pack 230, which may be made up of a number of battery modules connected in series and/or parallel, is connected to the DC distribution bus 213 via the DC:DC converter 217. The DC:DC converter 217 converts between a voltage of the battery pack 230 and a voltage of the DC distribution bus 213. In this way, the battery pack 230 can replace or supplement the power provided by the generator set 202 (by discharging and thereby feeding the DC distribution bus 212) or can be charged using the power provided by the generator set 202 (by being fed by the DC distribution bus 213).

Referring to FIG. 2B, in this example the propulsor 204 takes the form of a ducted fan. The fan 216 is enclosed within a fan duct 219 defined within a nacelle 221, and is mounted to a core nacelle 222. The fan 216 is driven by the electric machine 215 via a drive shaft 224, both of which may also be thought of as components of the propulsor 204. A gearbox 220 may be provided between the electric machine 215 and the drive shaft 224 to allow the fan 216 to rotate at a different (typically lower) rotational speed to the electric machine 215.

The electric machine 215 is supplied with electric power from a power source, for example the generator set 202 and/or the battery 230 via the DC bus 213. The electric machine 215 of the propulsor 204, and indeed the electric machine 211 of the generator set 202, may generally be of any suitable type, for example of the permanent magnet synchronous type.

Those skilled in the art will recognize the propulsion system 200 of FIGS. 2A-B to be of the series hybrid type. Other hybrid electric propulsion systems are of the parallel type, while still others are of the turboelectric type or have features of more than one type. The configuration of the more electric engine 101 of FIG. 1 may be considered similar to a parallel hybrid system, with the main distinction being the roles of the electric machines. For example, the electric machines of a more electric engine are generally only used in motor mode to start the engine and to improve engine operability, whereas the electric machines of a parallel hybrid propulsion system are used to motor the spools to meaningfully add to the amount of propulsive thrust produced by the turbomachinery.

Those skilled in the art will also appreciate that the hybrid architecture illustrated in FIG. 2A is only one example, and that other architectures, including architectures with ac distribution busses, are known and will occur to those skilled in the art.

Figure 3:
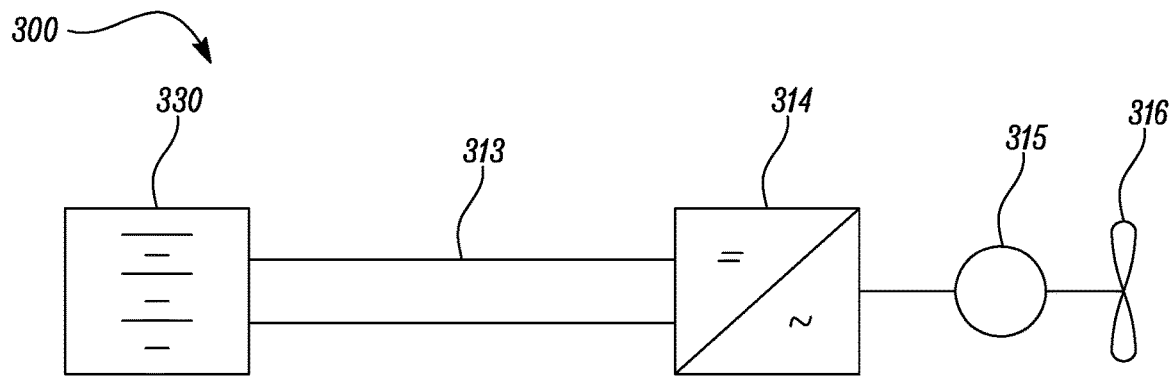
FIG. 3 is a schematic illustration of a purely electric aircraft propulsion system.

FIG. 3 illustrates an exemplary electric propulsion system 300 of a purely electric aircraft. Alternative electric propulsion system arrangements are known and will occur to those skilled in the art.

The propulsion system 300 includes a battery pack 330 that feeds a high voltage (HV) DC distribution bus 313, possibly via a DC:DC converter (not shown), which delivers power to one or more synchronous motors 315 via a DC:AC converter 314. The one or more motors 315 drive the one or more propellers 316 that propel the aircraft.

Figure 4:
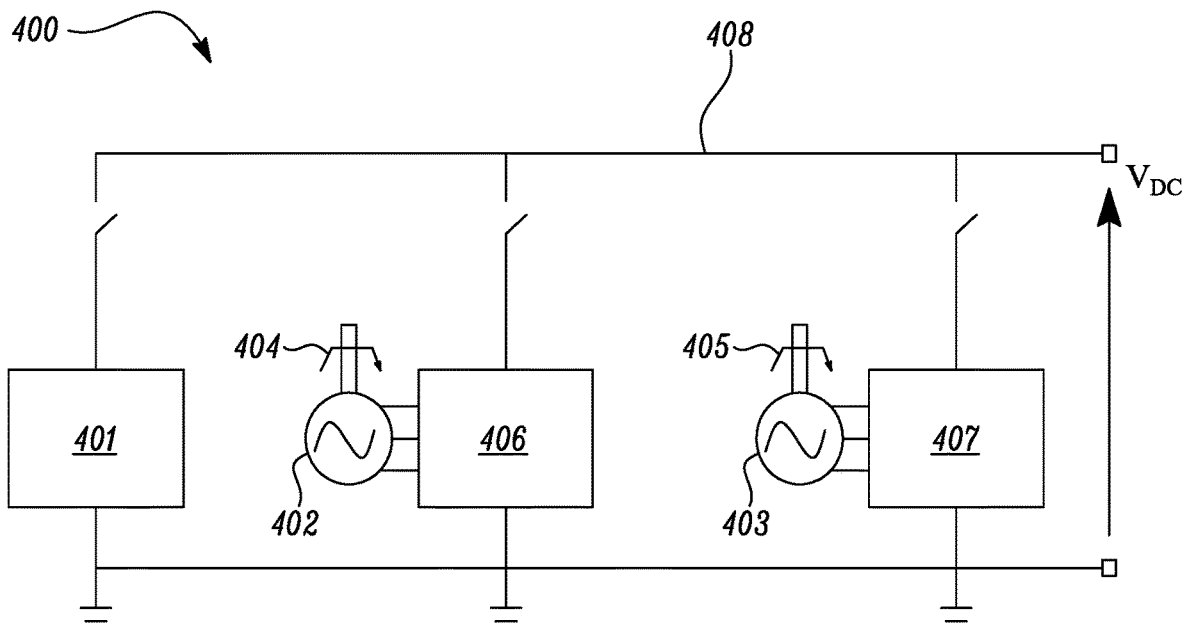
FIG. 4 is a schematic illustration of an example DC electrical power system with a direct battery connection.
Figure 5:
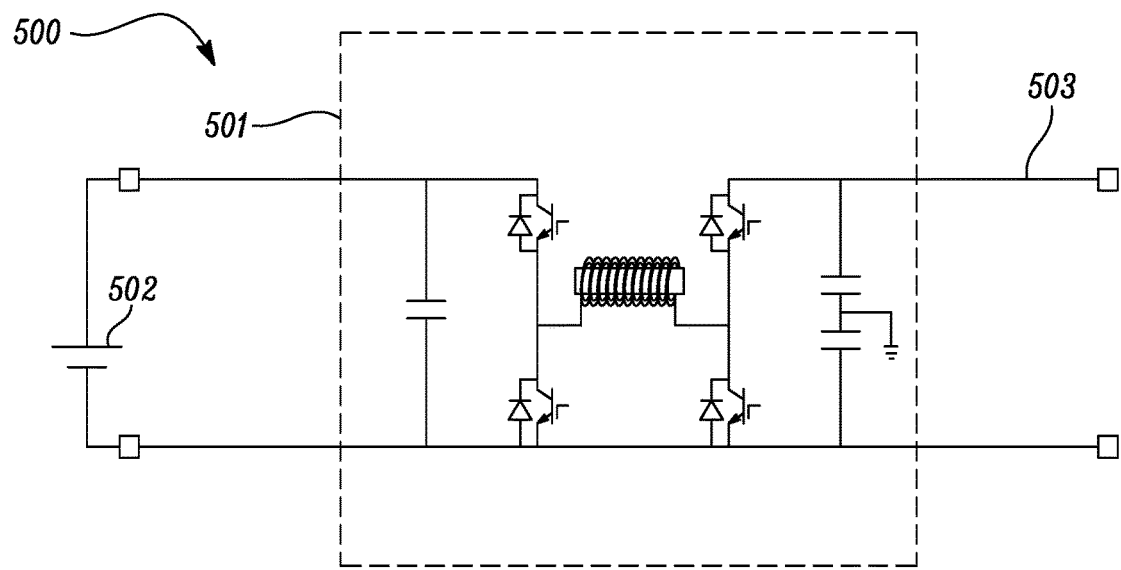
FIG. 5 is a schematic illustration of an example DC:DC converter between a battery and a DC power supply bus.

The DC electrical power systems 400, 500 illustrated in FIGS. 4 and 5 have been described above in relation to the background.

Figure 6:
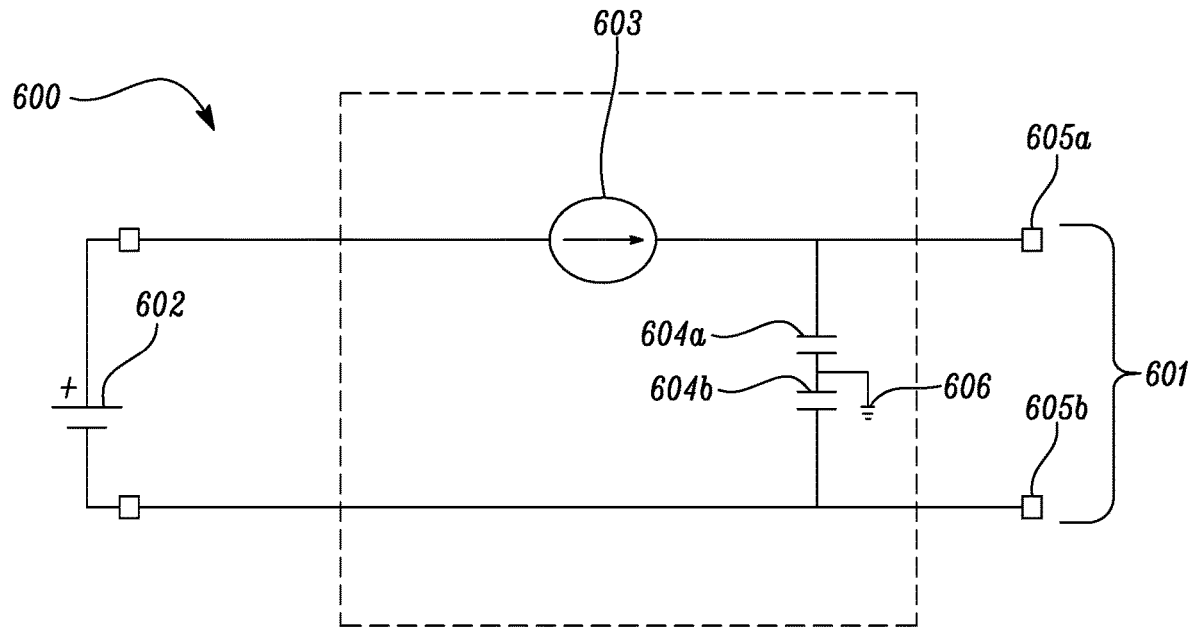
FIGS. 6 to 13 are schematic illustrations of various alternative example DC electrical power systems.

FIG. 6 illustrates an example DC electrical power system 600 in simplified form, the electrical power system 600 having a DC power bus 601, an electrical storage unit 602 (for example a battery) and a DC voltage source 603. The DC voltage source 603 is connected in series between the electrical storage unit 602 and the DC power bus 601 and is arranged to compensate for variations in the voltage across the electrical storage unit 602. A voltage across the voltage source 603 may for example add to or subtract from a voltage across the electrical storage unit 602 to maintain a required stable voltage across the DC power bus 601. For example, as the voltage across the electrical storage unit 602 decreases during discharging, the voltage across the voltage source 603 may be increased to compensate.

FIG. 6 illustrates the voltage source 603 connected between a positive terminal of the electrical storage unit 602 and a positive terminal 605a of the DC power supply bus 601. The voltage source 603 may alternatively be provided between a negative terminal 605b of the DC power supply bus and the negative terminal of the electrical storage unit 602. A voltage source may alternatively be connected to both positive and negative terminals 605a, 605b.

In the example in FIG. 6, first and second capacitors 604a, 604b are connected in series between first and second DC power bus terminals 605a, 605b. A ground or common connection 606 is provided between the first and second capacitors 604a, 604b, thereby providing a differential output. In alternative single-sided examples, the second DC power bus terminal 605b may be connected to a common connection.

Because the DC voltage source 603 is connected in series, it may be rated at a lower power rating than the electrical storage unit 602. If, for example, the voltage across the electrical storage unit 602 varies by up to 20%, the DC voltage source 603 may only be required to have a 20% power rating compared to the power rating of the electrical storage unit 602.

When the voltage source 603 conducts direct current, this either sinks or sources power. When sourcing power, i.e. when the electrical storage unit 602 is discharging, the voltage source 603 draws power from a DC power source, which may be the electrical storage unit 602 or another DC power source such as another electrical storage unit, the DC power supply bus 601 or another DC power supply bus. When sinking power, i.e. when the electrical storage unit 602 is charging, the voltage source sends power to the electrical storage unit 602, another electrical storage unit, the DC power supply bus 601 or another DC power supply bus. The voltage source is therefore required to be bidirectional to allow for the electrical storage unit 602 to be charged and discharged while maintaining a stable voltage across the DC power supply bus 601.

In an example implementation, the electrical storage unit 602 may be a battery capable of providing a nominal 540 V, resulting in a differential +/−270 V across the DC power supply bus 601. The voltage source 603 may be configured to supply up to 20% of the battery nominal voltage, i.e. up to around 108 V to compensate for up to a 20% loss in voltage across the battery 602 as the battery 602 discharges. If a voltage source is connected on each side of the DC voltage supply 601, each source may have a reduced rating, for example each being rated at up to 10% of the total power rating of the battery 602.

Because there needs to be voltage isolation between the series connected voltage source 603 and the power source or sink to which it is connected, the voltage source 603 is provided in the form of a DC:AC:DC dual active bridge (DAB) converter. Examples of electrical power systems having such a converter are illustrated in FIGS. 7 to 13, as described below.

Figure 7:
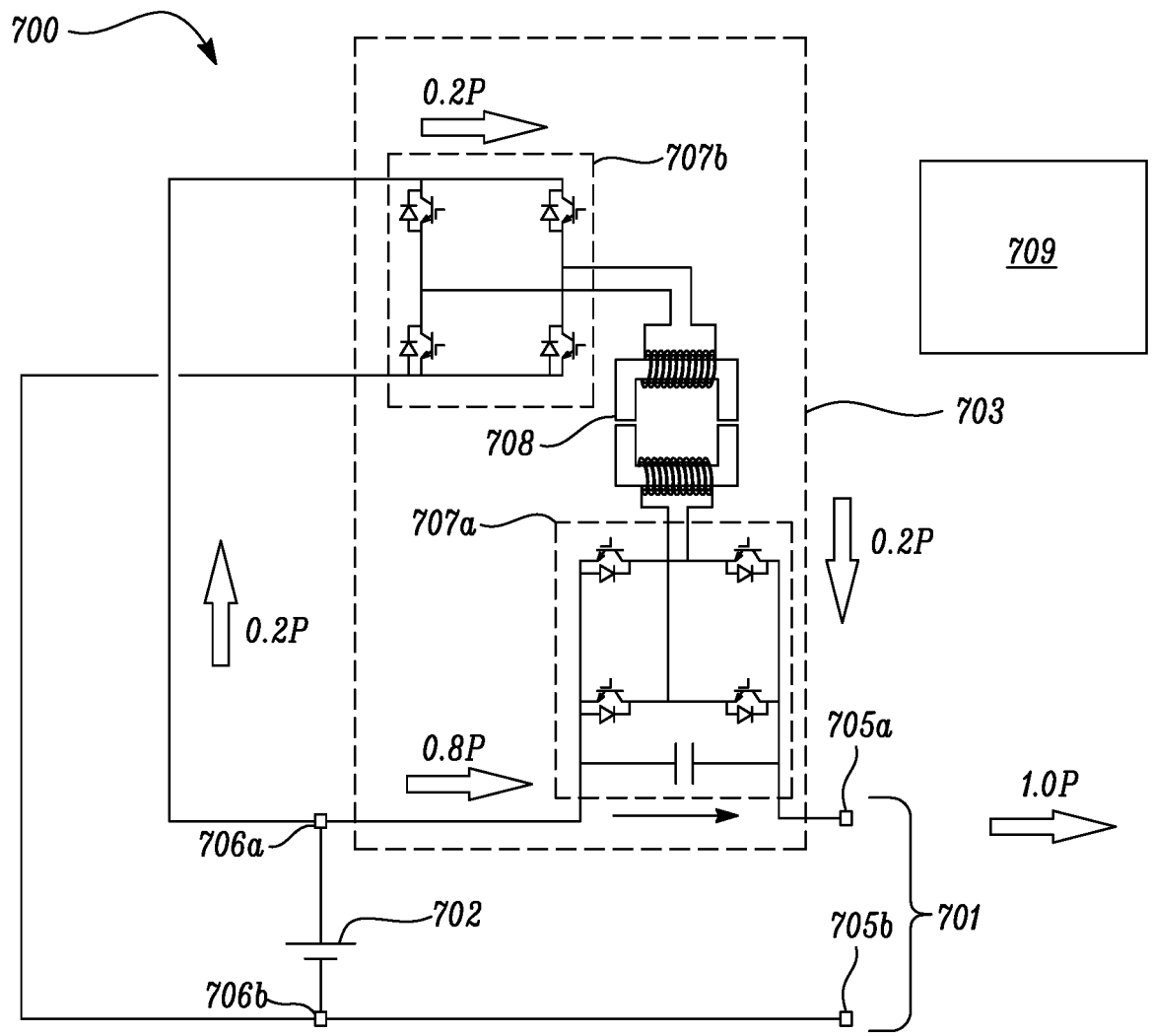

FIG. 7 illustrates schematically an example electrical power system 700 comprising a DC power bus 701, an electrical storage unit 702 and a DC voltage source 703 in the form of a bidirectional DC:DC converter. The DC power bus 701 has first and second DC power bus terminals 705a, 705b. The electrical storage unit 702 has first and second terminals 706a, 706b, the second terminal 706b connected to the second DC power bus terminal 705b. The second terminals 705b, 706b may be negative or ground terminals and the first terminals 705a, 706a positive terminals. The bidirectional DC:DC converter 703 comprises first and second DC:AC converter circuits 707a, 707b and a transformer 708 connected between the first and second DC:AC converters 707a, 707b. The first DC:AC converter 707a is connected between the first terminal 706a of the electrical storage unit 702 and the first DC power bus terminal 705a.

Each of the DC:AC converter circuits 707a, 707b is in the form of a switched mode power converter comprising a plurality of semiconductor devices, the switching operation of each being controlled by a controller 709. The controller 709 may be part of the PEM 115 as described above in relation to the engine 101 shown in FIG. 1. Switching sequences to achieve a desired DC:AC conversion will be well known to the skilled person. Each semiconductor device comprises a power transistor in parallel with a diode. Switching of the power transistors by signals received from the controller 709 (connections to which are not shown in FIG. 7 for clarity) allows a proportion of power flowing to or from the electrical storage unit 702 to be transferred between the converter circuits 707a, 707b via the transformer 708.

The transformer 708 serves to isolate the converter circuits 707a, 707b and to convert an AC current from one converter circuit to an AC current in the other converter circuit.

As shown in FIG. 7, during discharge of the battery 702 power flows from the battery 702 to the DC power bus 701 through the first and second converters 707a, 707b. If the battery has discharged to an extent that the voltage available has reduced by 20%, the battery will only provide 80% of the power P (i.e. 0.8 P) directly to the DC power bus 701. The remaining power (0.2 P) flows from the battery 702 through the second converter circuit 707b and is transformed by the transformer 708 and added to the power (0.8 P) flowing from the battery 702. The converter circuits 707a, 707b are controlled by the controller 709 with switching sequences to convert 20% of the power so that this adds to the 80% provided directly, with the result that the DC power bus 701 receives the full power at the required nominal voltage.

Figure 8:
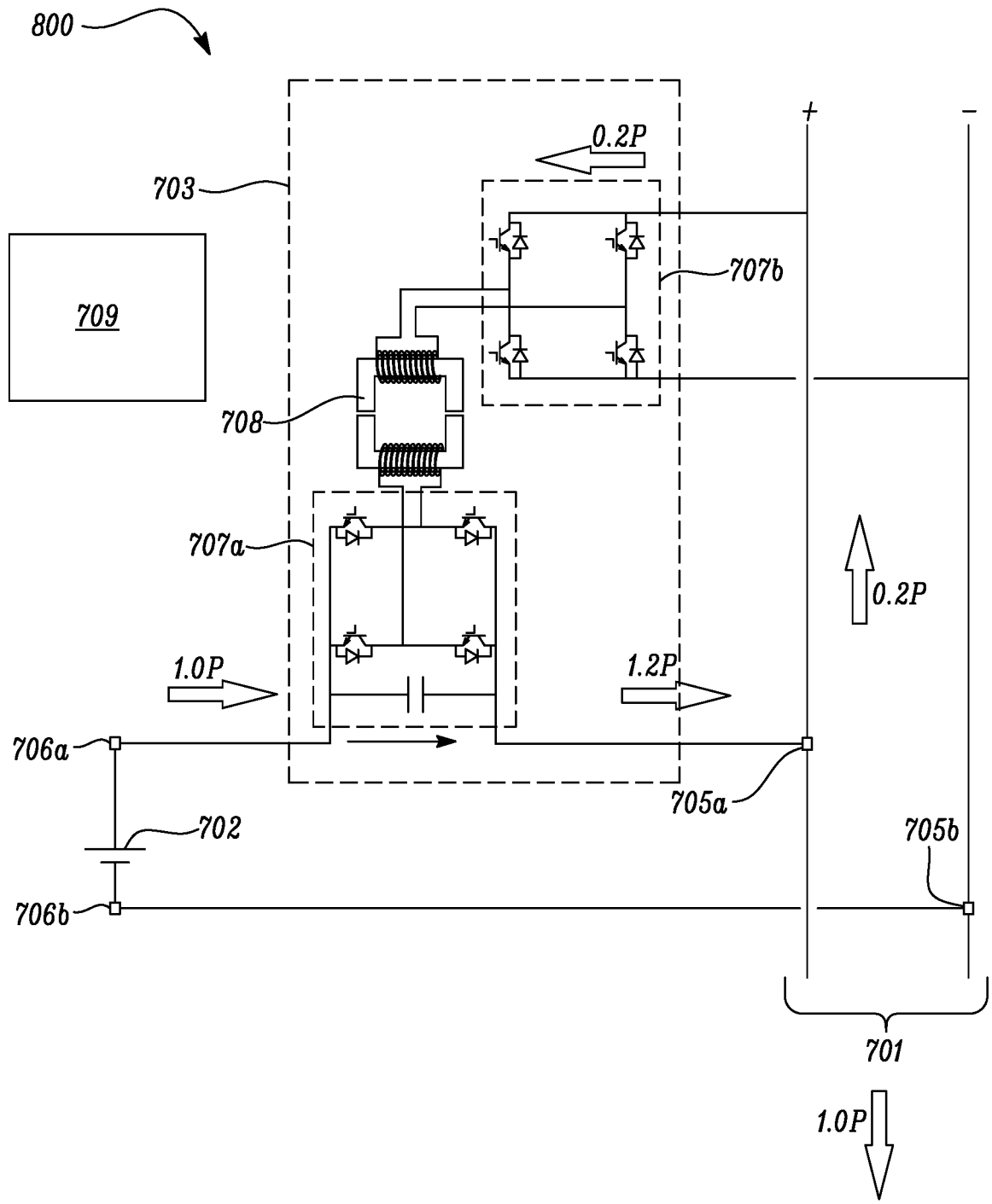
Figure 9:
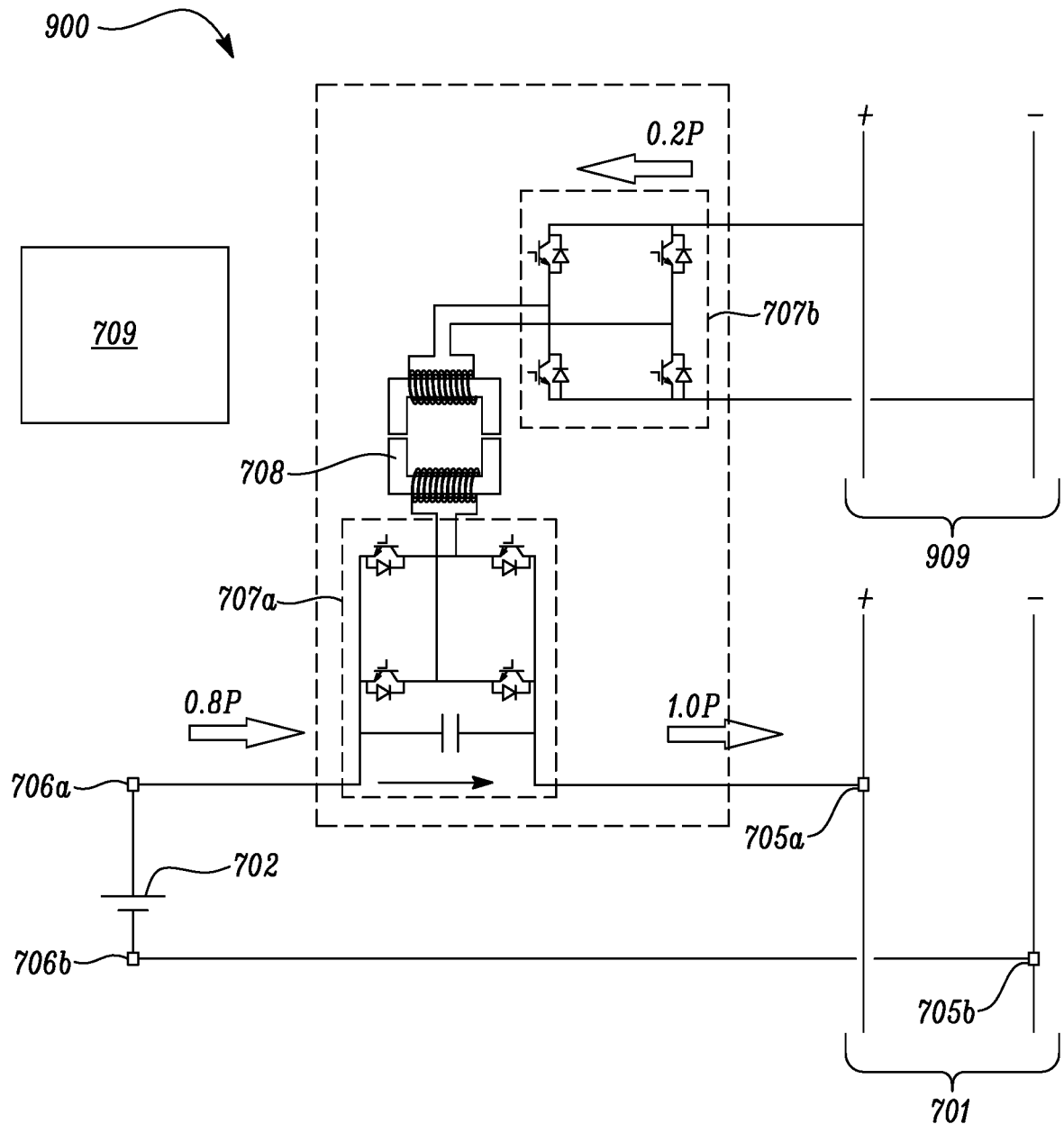

Instead of being connected across the battery 702, the second DC:AC converter 707b of the DC voltage source 703 may be connected across the DC power bus, as shown in the electrical power system 800 in FIG. 8, or a second DC power bus as shown in the electrical power system 900 in FIG. 9. The second DC power bus 909 may be connected across a second electrical storage unit (not shown) similar to the electrical storage unit 702. Other components of the systems 800, 900 are similar to those in the example illustrated in FIG. 7. The example in FIG. 9 enables power to be transferred between two DC power buses while maintaining galvanic isolation, which can be useful in cases where one DC bus is experiencing heavy loading requiring ESS support while another DC bus is more lightly loaded. In some examples, the second DC:AC converter 707b may be switchably connectable between two or more of the electrical storage unit 702, the DC power bus 701, a second DC power bus 909 and a second electrical storage unit (not shown).

A partially rated dual active bridge approach, as shown in FIGS. 6 to 9, may enable improvements in cost, size and weight compared to use of a fully rated DC:DC converter. In particular, the use of lower voltage semiconductors in the LV side [for example at a 20% voltage rating] of the DAB means the associated conduction losses will be lower than would be incurred with semiconductors rated for the full battery voltage. There is also the potential to improve the efficiency of the converters by applying soft switching [i.e. switching at around zero voltage and/or zero current] of the transistors to minimise switching losses, which is widely known for DAB converters. Also, with advanced Silicon Carbide [SiC] MOSFETs, there is the possibility to apply "synchronous rectification" methods, in which MOSFETs are controlled to carry current in a reverse direction to support or replace diode conduction with the benefit of reduced conduction losses. The use of soft switching and synchronous rectification may further reduce power losses during voltage stabilisation operation and hence reduce the burden on the thermal management and cooling system for the electronic power system.

Figure 10:
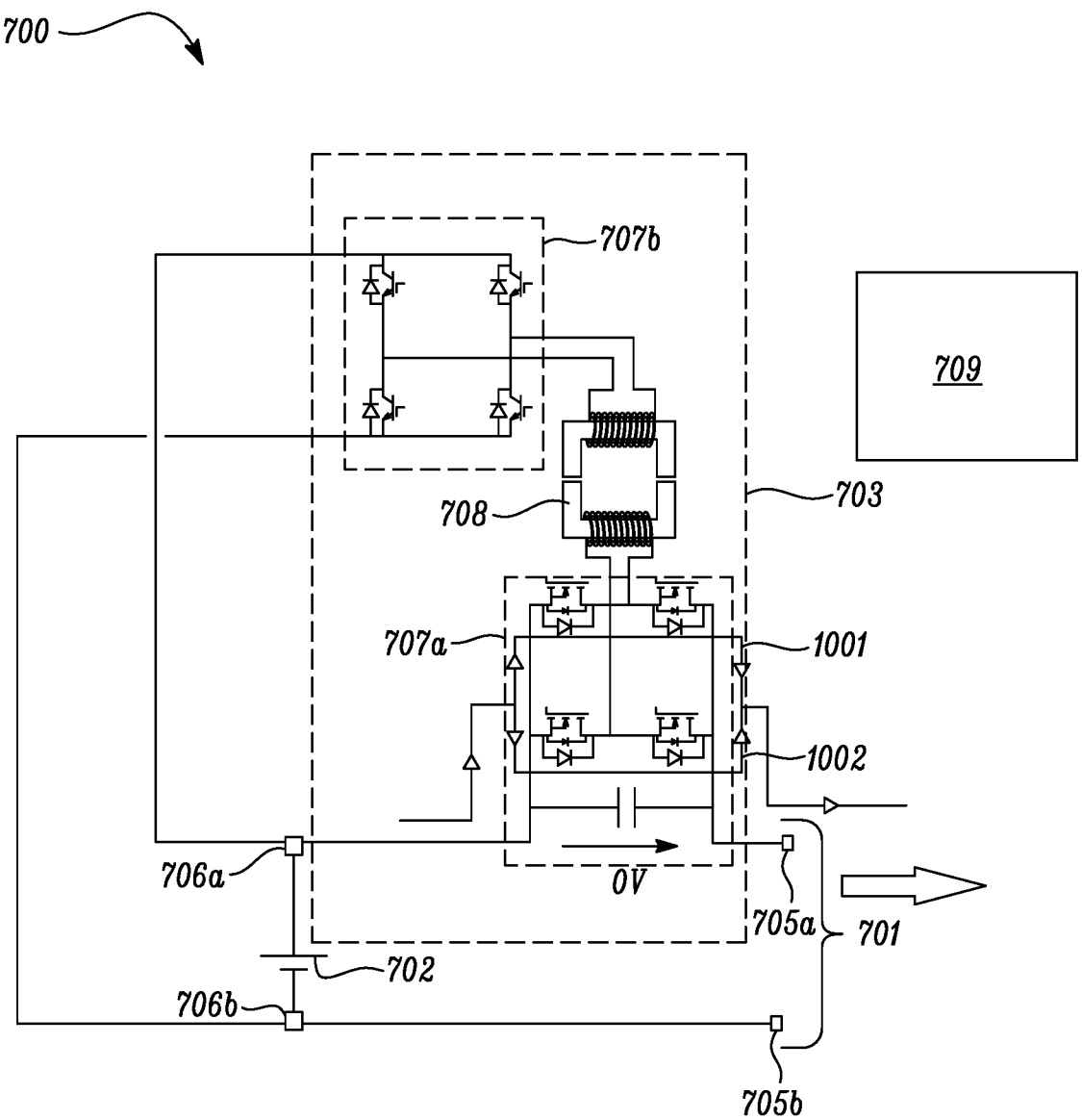

In cases where the battery 702 is charged to its nominal capacity such that the voltage across the battery 702 is equal to the required DC bus voltage, the converter 703 may be bypassed by disabling the second DC:AC converter 707*b* and switching the first DC:AC converter 707*a* to a bypass mode, as illustrated in FIG. 10. In this mode, the connection between the first terminal 706*a* of the battery 702 and the first terminal 705*a* of the DC power bus is shorted by turning on all the semiconductor devices to provide parallel current paths, shown schematically by paths 1001, 1002 in FIG. 10. Current from the battery 702 to the DC power bus 701 may then be carried by the MOSFETs and diodes of the semiconductor devices, allowing conduction losses presented by the converter 707*a* to be minimised and with no switching losses. In a general aspect therefore, the controller 709 may be configured to operate the first DC:AC converter 707*a* to provide a bypass connection between the battery 702 and the DC power bus 701 and to disable the second DC:AC converter when a voltage across the battery 702 is above a threshold level. The voltage across the battery 702 may for example be measured by a voltage sensor, the output of which is provided to the controller 709.

The examples described above relate to "boost" series injection methods where the battery discharges to a voltage below that of the DC network. The same approach may also be applied to "buck" series injection methods where the battery is designed to have a voltage higher than the DC network. This may be accommodated by connecting the series injection voltage source in the reverse direction, i.e. with the polarities of the semiconductor devices in the first DC:AC converter reversed. In a general aspect therefore, the first DC:AC converter 707*a* may be configured to provide a voltage across the DC power bus 701 that is either greater than (a boost converter) or less than (a buck converter) a voltage across the electrical storage unit 702.

Figure 11:
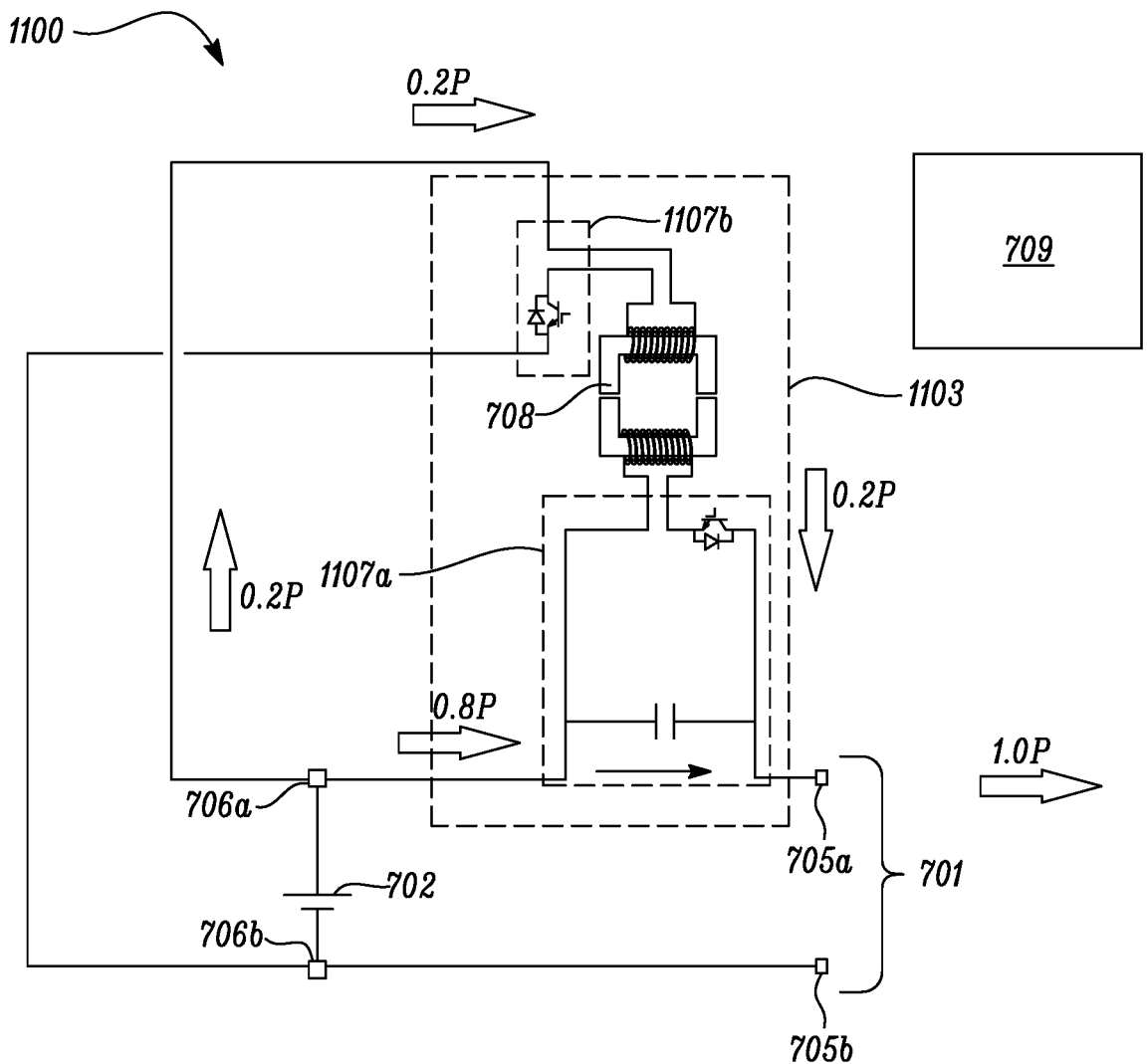

In addition to the dual active bridge isolated DC:DC converter, a further possibility, illustrated in the electrical power system 1100 in FIG. 11, is to utilise a bidirectional "flyback" converter 1103, which also provides the necessary isolation between the two sides of the converter. As with the other examples, the converter 1103 comprises a first DC:AC converter 1107*a*, a second DC:AC converter 1107*b* and a transformer 708. Operation of the semiconductor devices in each converter 1107*a*, 1107*b* is controlled by a controller 709 as with the other examples, with the difference being in the switching signals provided. A flyback converter differs from a DAB converter in that power flow through the converter is pulsed, i.e. it stores energy in one transformer winding during the first part of the switching cycle and then releases it during the second part of the switching cycle. Other possible DC to DC converter topologies with galvanic isolation may also be used.

Battery energy storage is generally characterised by having a low internal series resistance, which allows the battery to provide high levels of current to the DC network. This is observed when initially charging the battery from the DC network and normally requires the temporary introduction of a soft-start resistor which can be bypassed by a mechanical contactor once the battery and DC network voltages are equalised. Other disturbances and faults on the DC network can lead to large differences between the battery and DC network voltages which can also lead to temporarily high levels of current flowing. A directly connected battery may be susceptible to these potentially high current transients. A fast acting circuit breaker may therefore be used to connect the battery to the DC network, which can respond to interrupt the current before it gets too high to cause damage. Solid state circuit breakers can operate in microseconds and would therefore be a preferable choice for dealing with such problems.

The series voltage source can in some instances be used to compensate for the difference between the battery and DC network voltage in order to reduce or eliminate high current surges flowing between the two. By varying the value of the series injection voltage, a voltage is developed across the equivalent battery resistance, which in turn controls the current flowing in or out of the battery and may be used to vary the power exchanged with the ESS. This method of current control is dependent on the voltage capability and polarity of the series voltage source, whether in the form of a boost or buck converter, together with the series resistance of the battery. Given that the series voltage source is variable and can be changed at a rate set by the controller of the DAB or flyback converter, the series compensation method provides a degree of current control which may be superior to a directly connected battery. In a general aspect therefore, the controller may be configured to operate the DC:DC converter to limit current flow through the electrical storage unit during charging or discharging of the electrical storage unit.

The converter connected in parallel with the electrical storage unit can be used to cancel or minimise the impact of a voltage disturbance on the DC network which might otherwise lead to cause large dynamic currents to flow into the battery terminals. For example, in the case of an overvoltage surge on the DC power bus, a compensating current may be drawn by the second converter 707*b* (FIG. 7) to counteract the voltage surge by raising the series voltage across the first converter 707*a*. Current pushed towards the battery 702 can thereby be diverted away by the parallel converter 707*b* to protect the battery 702 from excess current.

Figure 12:
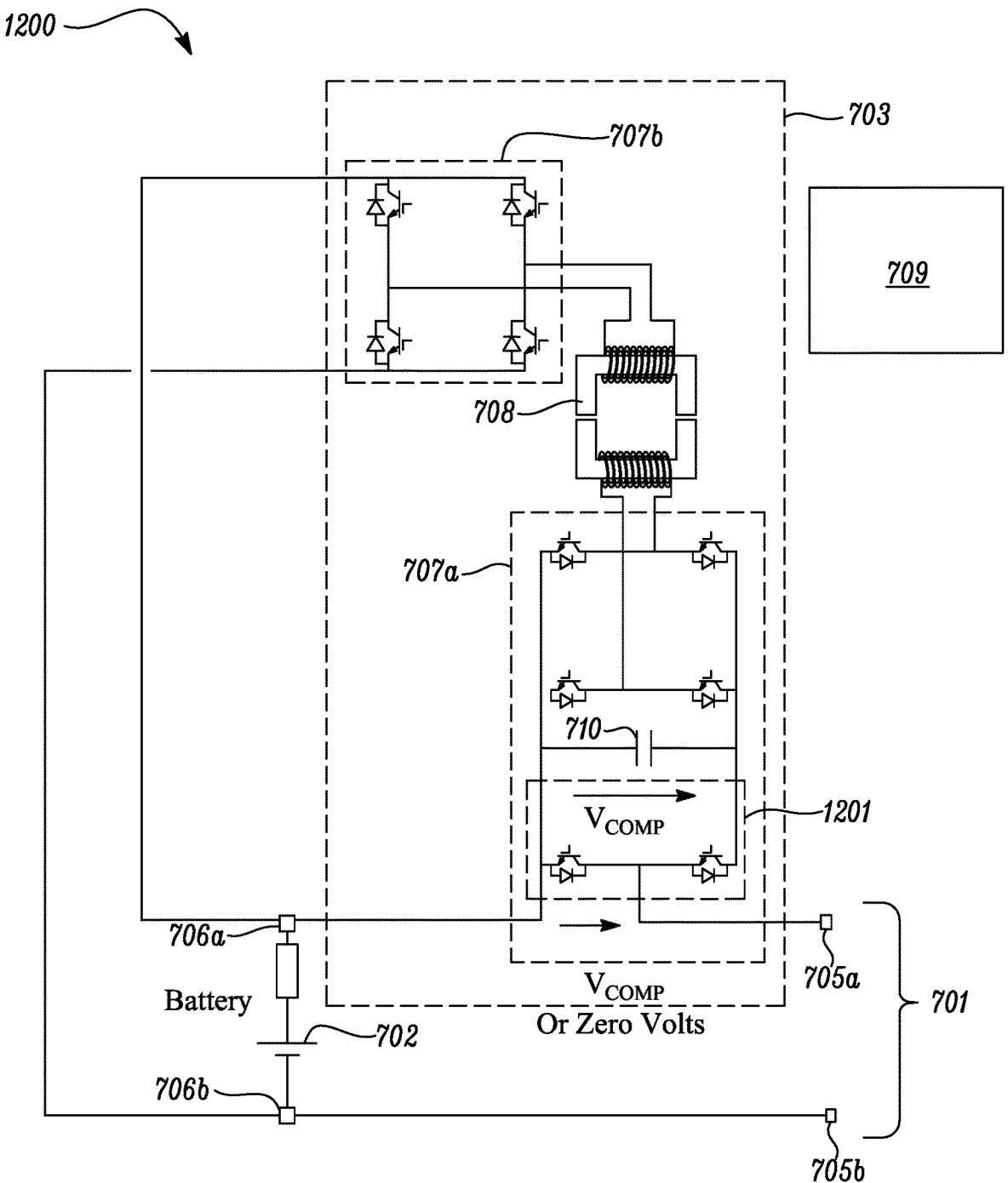
Figure 13:
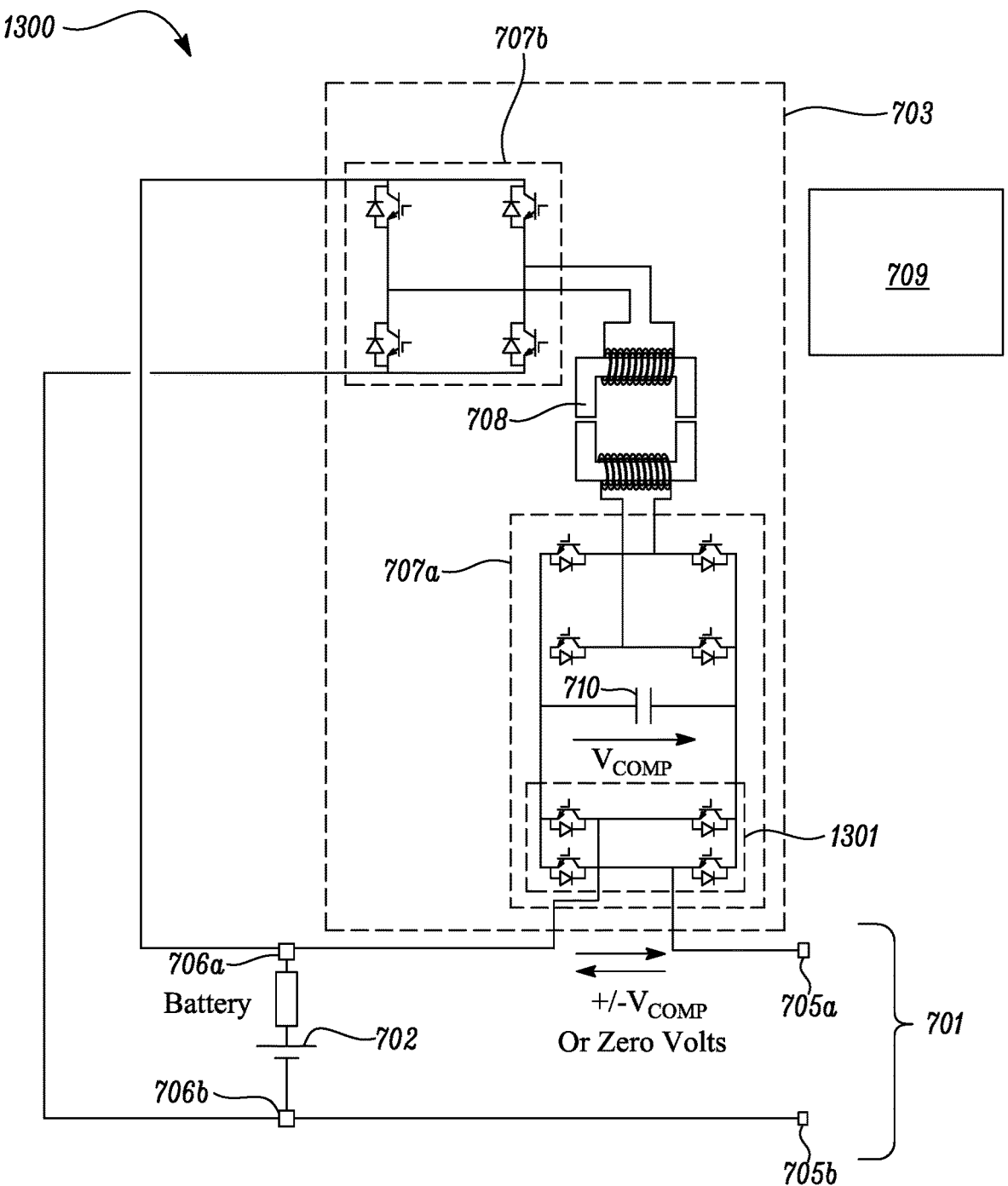

In the example electrical power systems described herein, series voltage compensation is achieved using a fixed capacitor 710, which is connected in series between the first battery terminal 706*a* and the first DC power bus terminal 705*a*. An extension to this may be used in which the capacitor 710 is switched in series with the battery 702 and/or may have its polarity reversed so the voltage injection may be positive or negative giving both boost and buck functionality. Example electrical power systems 1200, 1300 are illustrated in FIGS. 12 and 13 respectively in which a half-bridge switching circuit (FIG. 12) and a full bridge switching circuit (FIG. 13) is connected across the capacitor 710 connected between the first terminal 706a of the battery 702 and the first terminal 705a of the DC power bus 701. Switching of the capacitor 710 may be achieved using mechanical contactors, although it may be preferable to use semiconductor switches. It is important to note that the series voltage source 703 can be bypassed or inserted more rapidly when using semiconductor switches, enabling the series voltage to be changed between 0.2 per-unit and 0 without the delay introduced by charging and discharging the series converter capacitor 710.

In the electrical power system 1200 illustrated in FIG. 12, a half-bridge switching circuit 1201 enables the series compensation voltage to be connected or bypassed. In the electrical power system 1300 illustrated in FIG. 13, a full-bridge switching circuit 1301 enables the series compensation voltage to be connected in the positive or negative direction or be bypassed. As such it enables situations where the battery voltage is lower than the DC network or higher than the network to be addressed. The bypass mode may be used when the battery voltage is approximately equal to the DC network in a similar manner to that described above in relation to the system illustrated in FIG. 10 but without the need to discharge the DC capacitor providing the injection voltage.

The examples illustrated in FIGS. 12 and 13 are shown in connection with a dual active bridge DC:AC:DC arrangement and with the second converter 707b connected across the electrical storage unit 702, although other topologies including the alternative flyback arrangement illustrated in FIG. 11 may also be used. Similarly the single phase dual active bridge could be implemented with more than one phase, for example using a 3-phase AC link and isolation transformer.

An advantage of the examples illustrated herein is that a stabilised DC voltage may be provided from a battery-based ESS using only a partially rated power electronic converter, which is a significant improvement over a directly connected battery. The use of a partially rated converter means the electrical plant will tend to be cheaper, lighter, smaller and more efficient than the traditional method of voltage stabilisation using a fully rated DC:DC converter. In some implementations the series converter may be operated in an electronic bypass mode when the loading on the battery is low and/or the state of charge [SOC] is high. Here the battery voltage defines the operating voltage of the DC network to within acceptable limits [e.g. 5% of nominal voltage]. In a general aspect therefore, the controller may be configured to operate the first DC:AC converter to provide a bypass connection between the electrical storage unit and the DC power bus and disable the second DC:AC converter when a voltage across the electrical storage unit is within a threshold range, e.g. within 5%, of a voltage across the DC power bus.

A further advantage is that the electrical power system can provide bidirectional power transfer capability which is required during battery discharge and re-charge modes of operation. In some examples, however, unidirectional power transfer may be sufficient such as for battery-powered applications where charging of the battery is not carried out during travel.

Some aircraft may for example be powered battery powered during flight and re-charged when grounded. In such cases, the first converter 707a (see e.g. FIG. 7) may comprise a passive rectifier since a switching capability in the first converter is not required.

The electrical power system can offer some degree of current control which is better than a directly connected battery and may remove the need for the normal soft-start resistor-contactor solution when initially charging the battery from the DC network.

Boost and Buck solutions are possible to suit the specific application requirements.

The series converter can be designed to exhibit very low losses by using zero voltage and/or zero current switching, using synchronous rectification, using low voltage semiconductors in the 20% series converter part [inherent low conduction losses] and by employing electronic bypass where possible.

The real power required for the series voltage source can be exchanged with the battery, the DC network or another bespoke power supply operating at an optimised voltage. Exchanging for example a 20% power requirement with another DC power channel provides a means of transferring power between to two channels with galvanic isolation.

It may be possible to combine the boost and buck arrangements to produce a bidirectional buck-boost arrangement capable of injecting for example between 0-20% voltage in series with the battery in either the positive or negative directions. This would require the transistor-diode switches in the converter to be replaced with semiconductor-based switches with bidirectional voltage and bidirectional current capability which are well known in the power electronics industry and used in AC to AC "matrix" converters. This buck-boost variant is another method of achieving the performance of switched series voltage compensation shown in the example illustrated in of FIG. 13.

Various examples have been described, each of which feature various combinations of features. It will be appreciated by those skilled in the art that, except where clearly mutually exclusive, any of the features may be employed separately or in combination with any other features and the embodiments extend to and include all combinations and sub-combinations of one or more features described herein.

It will also be appreciated that whilst the embodiments have been described with reference to aircraft and aircraft propulsion systems, the electric machine drive techniques described herein could be used for many other applications. These include, but are not limited to, automotive, marine and land-based applications.

The invention claimed is:

1. An electrical power system comprising:
   a DC power bus having first and second DC power bus terminals;
   an electrical storage unit having first and second terminals, the second terminal connected to the second DC power bus terminal;
   a DC:DC converter having first and second DC:AC converters and a transformer connected between the first and second DC:AC converters, the first DC:AC converter connected between and to the first terminal of the electrical storage unit and the first DC power bus terminal; and
   a controller connected to control a switching operation of one or both of the first and second DC:AC converters.

2. The electrical power system of claim 1, wherein the DC:DC converter is bidirectional and the controller is connected to control a switching operation of each of the first and second DC:AC converters.

3. The electrical power system of claim 1, wherein the second DC:AC converter is connected across a DC power source.

4. The electrical power system of claim 3, wherein the DC power source is the electrical storage unit.

5. The electrical power system of claim 3, wherein the DC power source is the DC power bus.

6. The electrical power system of claim 3, wherein the DC power bus is a first DC power bus, the electrical power system comprising a second DC power bus, the DC power source being the second DC power bus.

7. The electrical power system of claim 1, wherein the electrical storage unit is a first electrical storage unit, the electrical power system comprising a second electrical storage unit, the DC power source being the second electrical storage unit.

8. The electrical power system of claim 1, wherein the first and second DC:AC converters are configured to operate at up to around 20% of a power rating of the electrical storage unit.

9. The electrical power system of claim 1, wherein the power rating of the electrical storage unit is 50 kW or more.

10. The electrical power system of claim 1, wherein each of the first and second DC:AC converters comprises a plurality of semiconductor devices, the controller configured to control a switching operation of each of the plurality of semiconductor devices.

11. The electrical power system of claim 10, wherein the controller is configured to operate the first DC:AC converter to provide a bypass connection between the electrical storage unit and the DC power bus and disable the second DC:AC converter when a voltage across the electrical storage unit is above a threshold level.

12. The electrical power system of claim 1, wherein the first DC:AC converter is configured to provide a voltage across the DC power bus that is greater than a voltage across the electrical storage unit.

13. The electrical power system of claim 1, wherein the first DC:AC converter is configured to provide a voltage across the DC power bus that is less than a voltage across the electrical storage unit.

14. The electrical power system of claim 1, wherein the DC:DC converter is a dual active bridge, DAB, converter.

15. The electrical power system of claim 1, comprising a capacitor connected between the first terminal of the electrical storage unit and the first DC power bus terminal and a half-bridge or full-bridge switching circuit connected across the capacitor.

16. An aircraft power and propulsion system comprising:
a DC power bus having first and second DC power bus terminals;
a DC:AC converter connected to the DC power bus;
an electric machine and a fan, the electric machine connected to the DC:AC converter to receive power from the DC power bus to drive the fan;
an electrical storage unit having first and second terminals, the second terminal connected to the second DC power bus terminal;
a DC:DC converter having first and second DC:AC converters and a transformer connected between the first and second DC:AC converters, the first DC:AC converter connected between and to the first terminal of the electrical storage unit and the first DC power bus terminal; and
a controller connected to control a switching operation of one or both of the first and second DC:AC converters.

17. An aircraft comprising the electrical power and propulsion system of claim 16.

18. An electrical power system comprising:
a DC power bus having first and second DC power bus terminals;
an electrical storage unit having first and second terminals, the second terminal connected to the second DC power bus terminal;
a DC:DC converter having first and second DC:AC converters and a transformer connected between the first and second DC:AC converters, the first DC:AC converter connected between the first terminal of the electrical storage unit and the first DC power bus terminal; and
a controller connected to control a switching operation of one or both of the first and second DC:AC converters
wherein each of the first and second DC:AC converters comprises a plurality of semiconductor devices, and
wherein the controller is configured to:
control a switching operation of each of the plurality of semiconductor devices; and
operate the first DC:AC converter to provide a bypass connection between the electrical storage unit and the DC power bus and disable the second DC:AC converter when a voltage across the electrical storage unit is above a threshold level.

* * * * *